United States Patent [19]

Paulson

[11] Patent Number: 4,991,681
[45] Date of Patent: Feb. 12, 1991

[54] MOTOR VEHICLE BRAKING SYSTEM

[75] Inventor: William C. Paulson, Georgetown, Canada

[73] Assignee: S.B.R. Limited, Guernsey, Channel Islands

[21] Appl. No.: 309,881

[22] Filed: Feb. 14, 1989

Related U.S. Application Data

[63] Continuation-in-part of Ser. No. 70,796, Jul. 7, 1987, abandoned, which is a continuation-in-part of Ser. No. 877,256, Jun. 23, 1986, abandoned.

[51] Int. Cl.$^5$ .......................... B60T 7/12; B60K 28/00
[52] U.S. Cl. .......................................... 180/275; 293/5
[58] Field of Search ............... 180/275, 279, 272, 287, 180/271, 278, 277; 293/5

[56] References Cited

U.S. PATENT DOCUMENTS

| | | | |
|---|---|---|---|
| 4,403,674 | 9/1983 | Viall, Sr. et al. | 180/275 |
| 4,633,968 | 1/1987 | Fisher et al. | 180/275 |
| 4,641,871 | 2/1987 | Vaughn | 180/275 |
| 4,799,570 | 1/1989 | Anderson | 180/275 |

Primary Examiner—Richard A. Bertsch
Attorney, Agent, or Firm—Smart & Biggar

[57] ABSTRACT

A method and apparatus for operating the braking system of a vehicle, in which the system is automatically, on movement of the vehicle, pneumatically armed for actuation by a detector signal to cause brake application, and the armed brake system is actuated by a contact of the moving vehicle with an obstruction to generate a pneumatic signal, the braking system being releasable and automatically rearmable. In another mode the braking system is constantly armed.

33 Claims, 12 Drawing Sheets

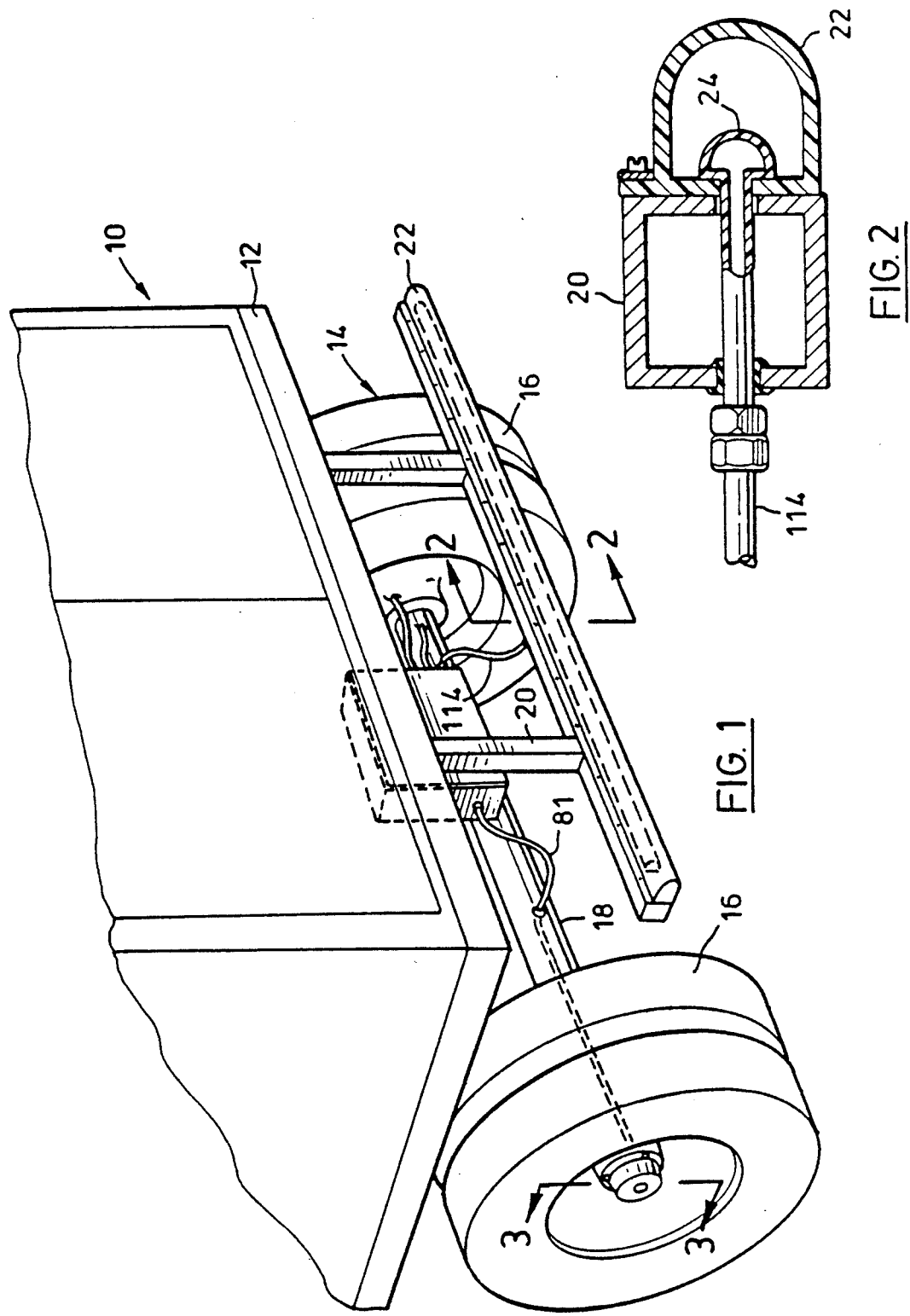

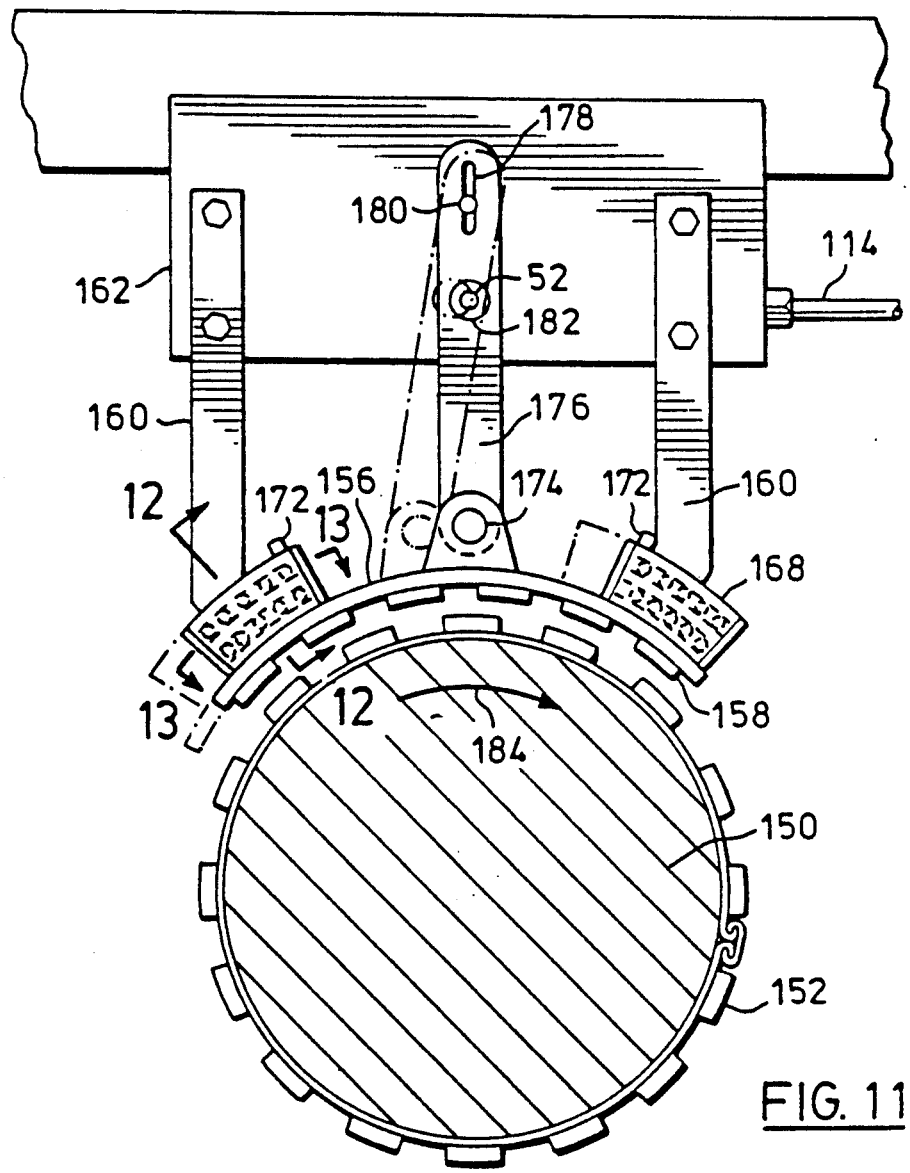
FIG. 11
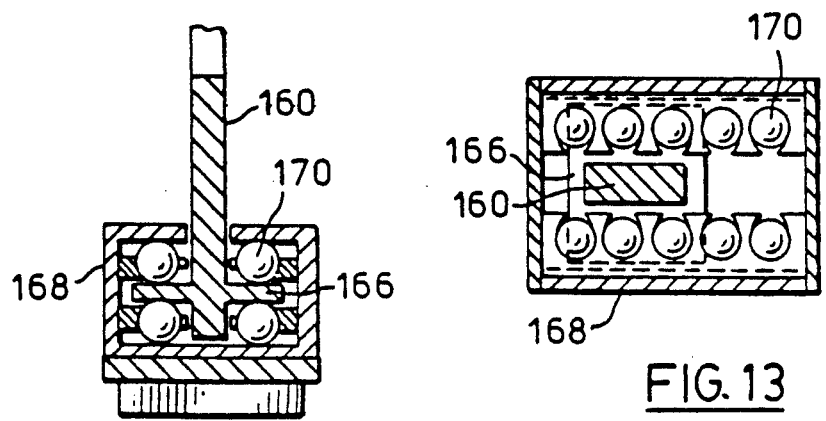
FIG. 12
FIG. 13

MOTOR VEHICLE BRAKING SYSTEM

RELATED APPLICATIONS

This application is a continuation-in-part of United States patent application Ser. No. 070,796 filed July 7, 1987, now abandoned, which is a continuation-in-part of United States patent application Ser. No. 877,256 filed June 23, 1986, now abandoned.

STATEMENT OF PRIOR ART

The applicant is away of the following relevant prior references:

| Patent No. | Name |
| --- | --- |
| U.S. Pat. No. 3,986,577 | Ebbesson et al |
| U.S. Pat. No. 4,105,237 | Viall, Sr. et al |
| U.S. Pat. No. 4,407,388 | Steel |
| United Kingdom Patent No. 1,536,235 | Ebbesson |
| United Kingdom Patent No. 2,027,828B | Fisher et al |
| United Kingdom Patent Appln. No. 2,007,32A | Turzynski |
| Canadian Patent No. 1,119,644 | Fisher et al |
| U.S. Pat. No. 4,633,968 | Fisher et al |

FIELD OF THE INVENTION

This invention relates to a motor vehicle braking system providing automatic braking when the vehicle detects an obstruction.

BACKGROUND OF THE INVENTION

It is already known, particularly in connection with goods-carrying vehicles, to provide at the rear of the vehicle (which may for example be a truck of the trailer of a tractor/ trailer combination) a detector which, when the vehicle reverses, detects an obstruction and serves to generate a signal which can be used to initiate application of the vehicle's brakes so bringing the vehicle to a standstill and minimizing the risk of damage or injury to any obstruction or person behind the vehicle.

There are several types of such detectors available, and at least one known system is interrelated to a driver-controlled reverse gear selector on the vehicle in such a manner that the system is armed or made ready for brake application to be effected upon receiving a signal from the detector only when the vehicle's driver has selected reverse gear. Thus with this system a signal generated by the detector causes brake application only when the vehicle's driver has deliberately operated the selector for the vehicle to be driven backwards.

There are other methods which necessitate the engaging of an electrical switch, or the operating of a camera and associated equipment, and rely on the driver to control or activate. None of these will operate automatically if for instance the vehicle should commence running backwards, e.g. down a hill when out of gear, or as a result of being impacted at the front. Thus the prior proposed systems do not safeguard against the risk of accident in the event of unintentional reverse movement of the vehicle, which can arise in a substantial number of varied circumstances of which possible the most important one is the risk arising from inattentive parking upon an inclined surface.

An object of the present invention is to provide a braking system with safeguards against any movement of a vehicle, whether intentional or unintentional, and in which the need for operation of an electrical switch or a gear selector of the vehicle is obviated.

STATEMENT OF THE INVENTION

With this object in view, the present invention provides a method and apparatus for automatically actuating the braking system of a vehicle, in which contact of the vehicle with an obstruction is detected as the vehicle moves and a pneumatic signal is generated. The system is pneumatically armed, on movement of the vehicle, to cause brake application on detection of the signal.

The system may include a sensor which senses rotation of a component of the vehicle rotating in a first direction on movement of the vehicle in one direction and in the reverse direction upon movement of the vehicle in the opposite direction, the system being armed only when the vehicle is moving in said reverse direction.

Alternatively the system may be armed at all times, either by an auxiliary air tank or by application of the foot brake or the trailer only brake, or by the emergency brake system, and it may be disarmed on the vehicle attaining a predetermined speed or after a predetermined time lapse.

BRIEF DESCRIPTION OF THE DRAWINGS

An example embodiment of the invention is shown in the accompanying drawings in which:

FIG. 1 is a perspective view of the rear portion of the trailer of a tractor-trailer combination;

FIG. 2 is a transverse cross-sectional view of the the rear bumper of the trailer taken along line 2—2 of FIG. 1;

FIG. 11 is a cross-sectional view of a second embodiment of the invention associated with the drive shaft of a vehicle;

FIG. 12 is a view taken along line 12—12 of FIG. 10;

FIG. 13 is a view taken along line 13—13 of FIG. 11;

DESCRIPTION OF PREFERRED EMBODIMENT

Figure 3:
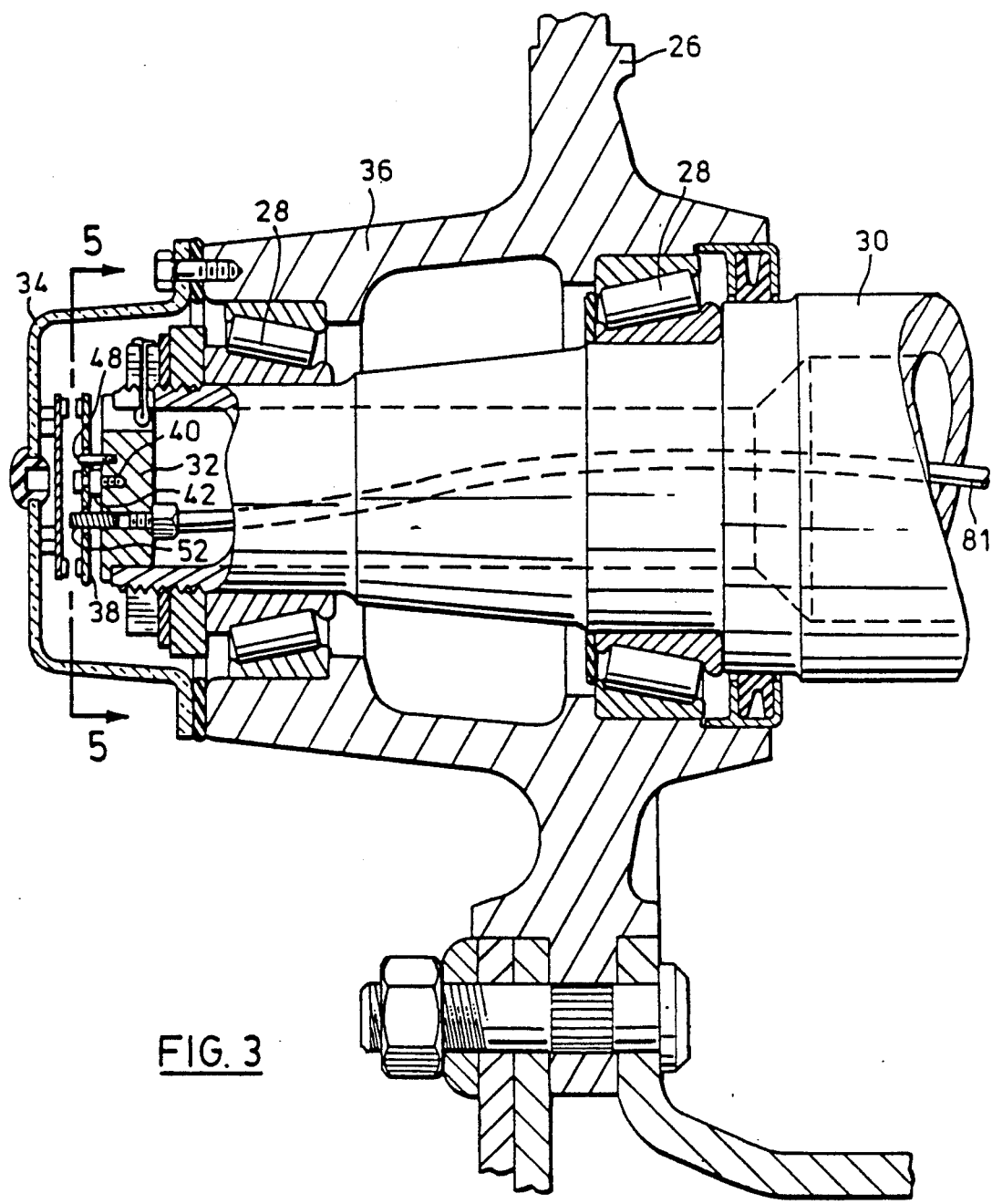
FIG. 3 is a cross-sectional view of a first embodiment associated with the wheel hub assembly of the trailer of FIG. 1.
Figure 4:
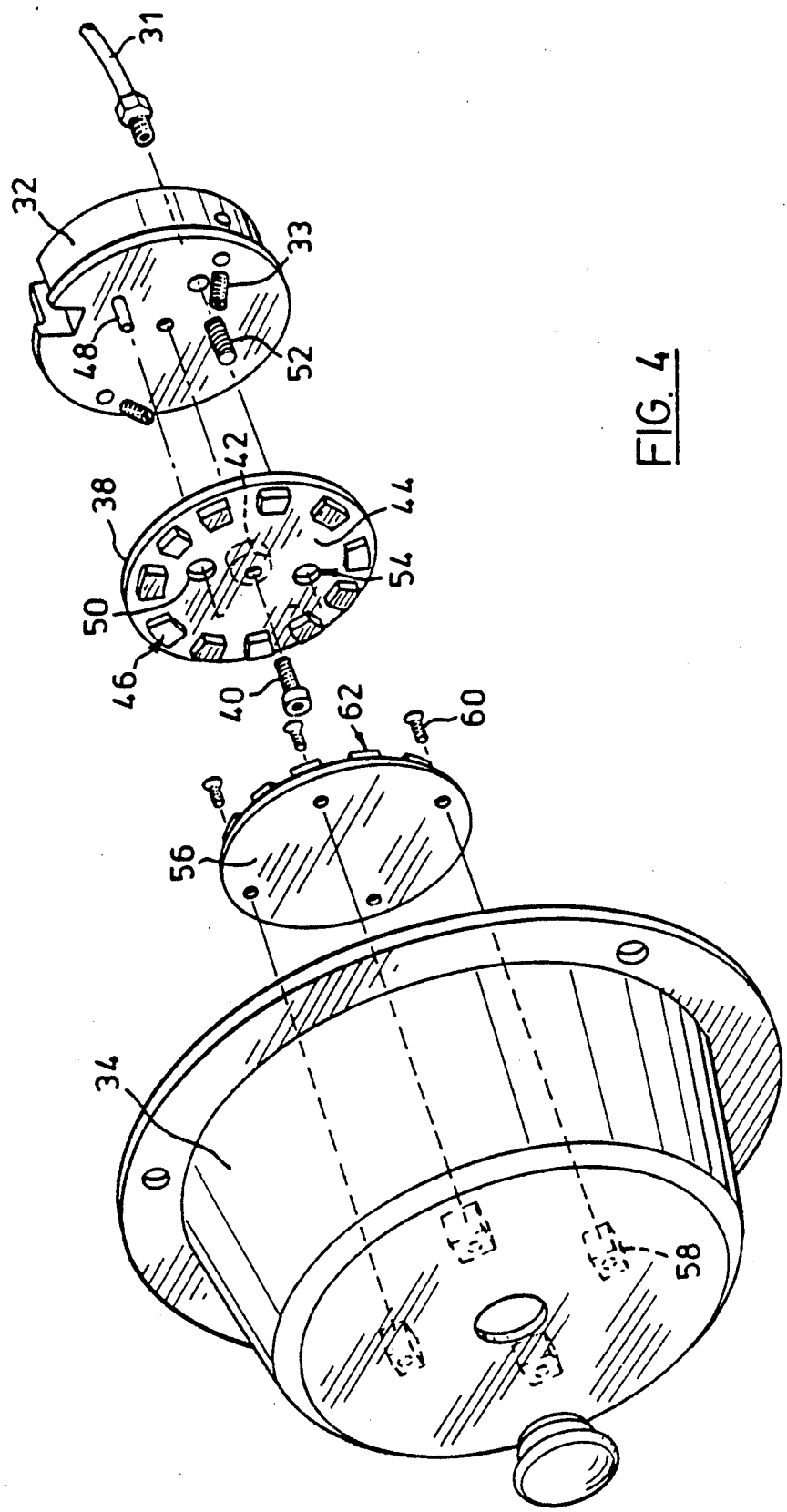
FIG. 4 is an exploded perspective view of the rotation detector of the wheel hub assembly of FIG. 3.

The embodiment shown in FIGS. 1 to 10 of the drawings consists of a trailer 10 of a tractor-trailer combination, with a body frame 12 and including a set of rear wheels 14 comprising a pair of wheels 16 journally mounted for free rotation on a fixed axle 18. A fixed bumper frame 20 depends from body frame 12 and carries a rearwardly projecting pneumatic bumper tube 22 of flexible material. As seen in FIG. 2, a second pneumatic tube 24 is disposed within bumper tube 22 and extends substantially the length of the bumper tube.

The hub assembly of one wheel 16 is shown in FIG. 3 and comprises a wheel hub 26 journally mounted by bearings 28 on a fixed axle 30 having an axle bore closed at one end by a plug 32 which is fixed by set screws 33 to the axle and which faces a hub cap 34 mounted on boss 36 of wheel hub 26. As seen more particularly in FIG. 4, a first magnet disc 38 is auxiliary mounted for rotation on plug 32 by a pivot bolt 4D and spaced from the plug by a bushing 42 on the disc. The outer face 44 of disc 38 carries a ring 46 of fixed, spaced magnets. A stop pin 48 projects from plug 32 through a first aperture 50 in disc 38 and a spring air valve 52 projects from the plug through a second aperture 54 in disc 38 radially opposite to aperture 50 with respect to aperture 50. A second magnet disc 56 faces first magnet disc 38, being fixed to hub cap 34 on blocks 58 by bolts 60. Disc 56 carries a ring 62 of fixed, spaced magnets which registers with ring 46 on disc 38.

Figure 9:
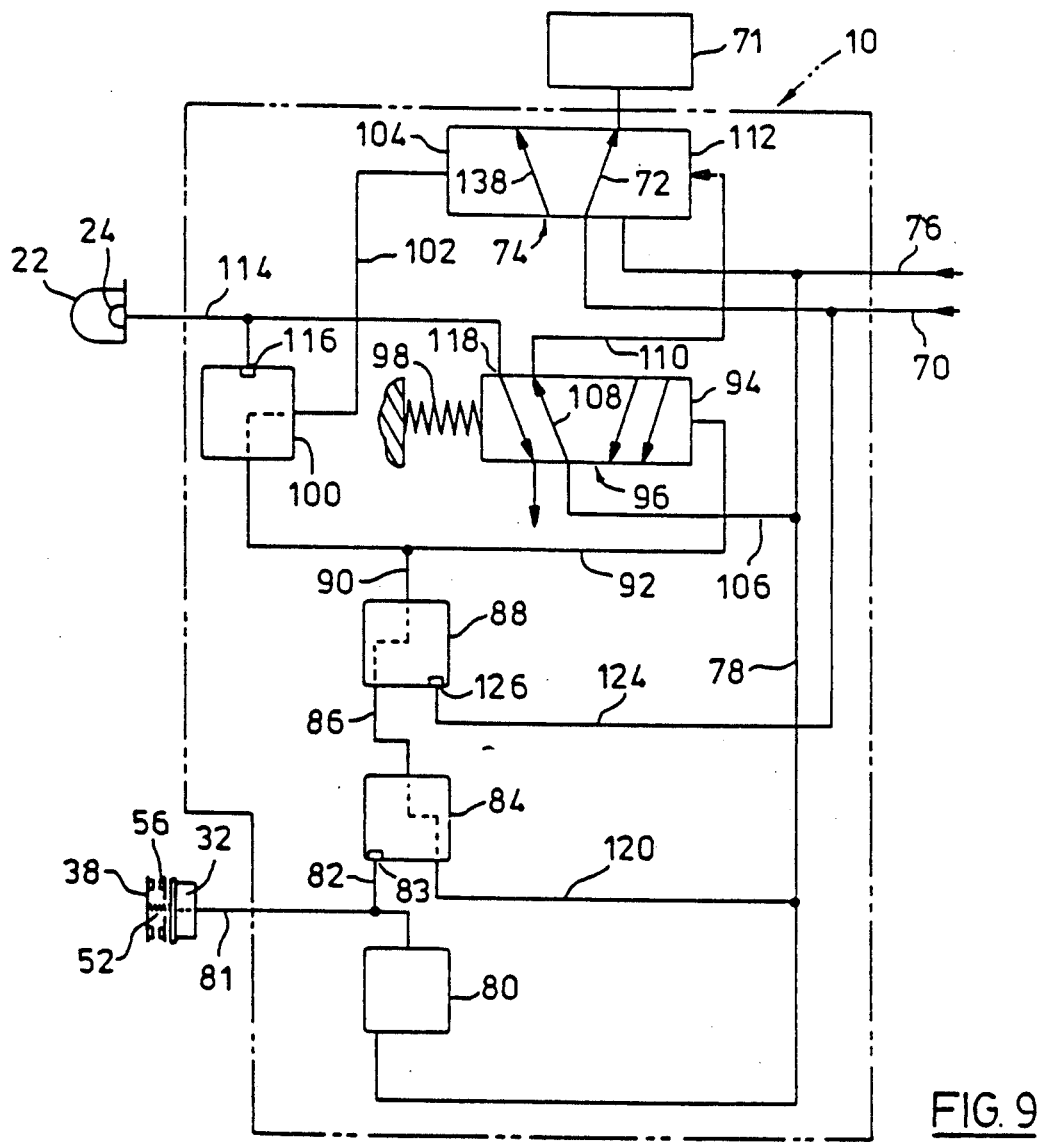
FIG. 9 is a schematic flow diagram of the air brake system of the device.

The air flow system associated with trailer 10 is shown in FIG. 9 of the drawings and consists of an air brake supply line 70 passing to a service brake system 71 of the trailer through a normally open port 72 of a first shuttle valve 74, and an auxiliary air line 76 normally closed by shuttle valve 74.

Brake supply line 70 leads from the service or foot brake 70a or from the trailer only brake 70b (the separate trailer brake which is also called "the spike"). Auxiliary air supply line 76 is connected by a line 78 to a pressure reducing valve 80 and from valve 80 through a line 81 to a normally closed spring air valve 52. Line 81 is connected by a line 82 to control port 83 of a first normally closed pass control valve 84. Auxiliary air supply line 76 is connected through line 78 by a line 120 to pass control valve 84, thence by a line 86 to a second normally open pass control valve 88, and thence by a line 90 to connect with a line 92 impinging on one end 94 of a second shuttle valve 96 which bears at its other end on a compression spring 98. Line 92 connects also through a normally closed third pass control valve 100 and a line 102 to impinge on one end 104 of first shuttle valve 74. Auxiliary air supply line 76 connects, by a line 106 through a normally open port 108 of second shuttle valve 96, with a line 110 which impinges on the other end 112 of first shuttle valve 74. Bumper tube 24 is connected by an air line 114 to control port 116 of pass control valve 100 and to a normally open port 118 of shuttle valve 96 to air. Brake line 70 is connected by a line 124 to control port 126 of pass control valve 88.

Figure 5:
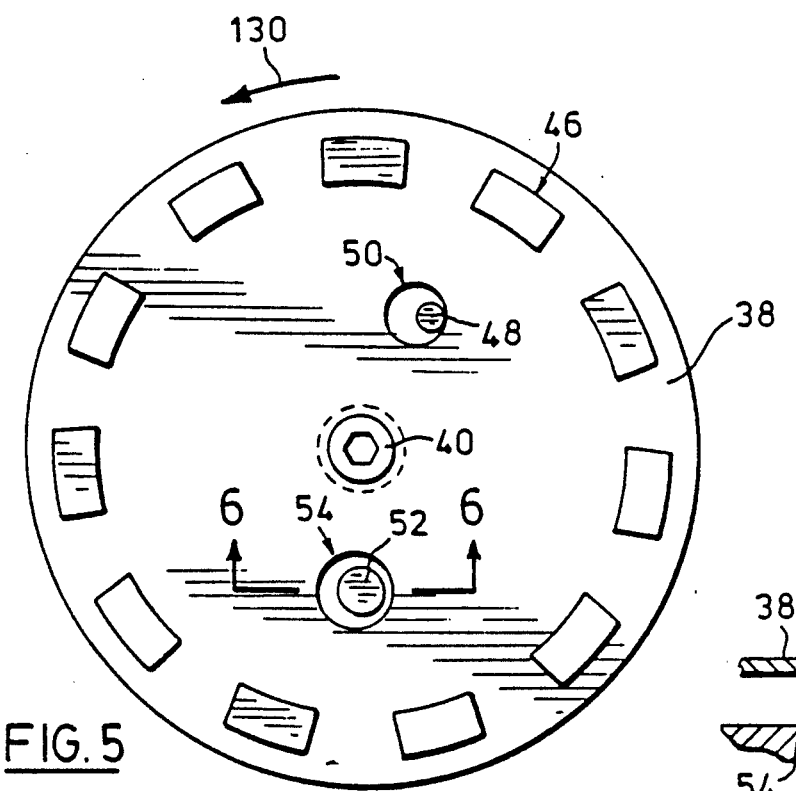
FIG. 5 is a view of the magnetic activator disc of the rotation detector of FIG. 4 taken along line 5—5 of FIG. 3 and showing its position in relation to the valve pin when the trailer is moving forwardly.
Figure 6:
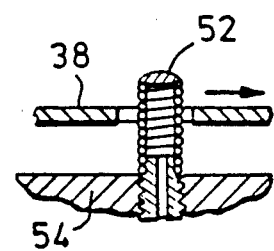
FIG. 6 is a cross-sectional view taken along line 6—6 of FIG. 5.
Figure 7:
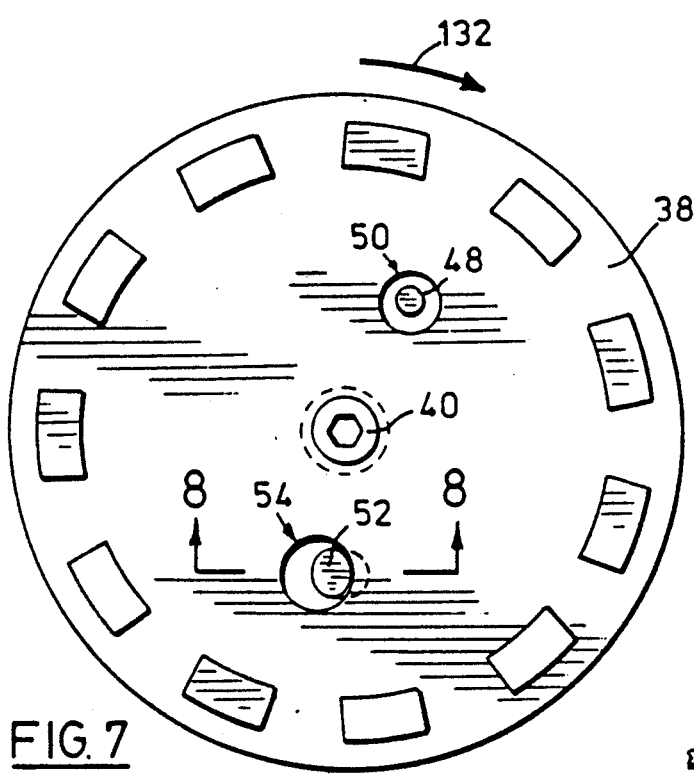
FIG. 7 is a view similar to FIG. 5 showing the position of the disc in relation to the valve pin when the trailer is moving in reverse.
Figure 8:
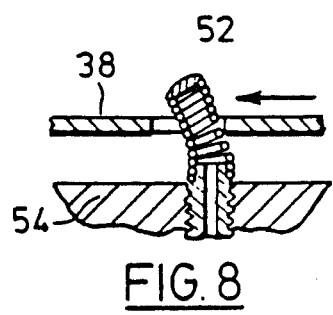
FIG. 8 is a cross-sectional view taken along line 8—8 of FIG. 7.

In the operation of the embodiment of FIGS. 3 to 8 the operator normally controls the brake system of trailer 10 through brake line 70. When trailer 10 is moving forward magnetic disc 56 rotates magnetic disc 38 in the direction of arrow 130 as seen in FIG. 5 and pin 48 prevents valve 52 from being opened, as seen in FIG. 6. However, movement of trailer 10 in reverse, i.e. backwards, causes disc 56 to rotate disc 38 in the opposite direction as indicated by arrow 132 in FIG. 7 and this movement of disc 38 opens valve 52 as seen in FIG. 8.

Figure 10:
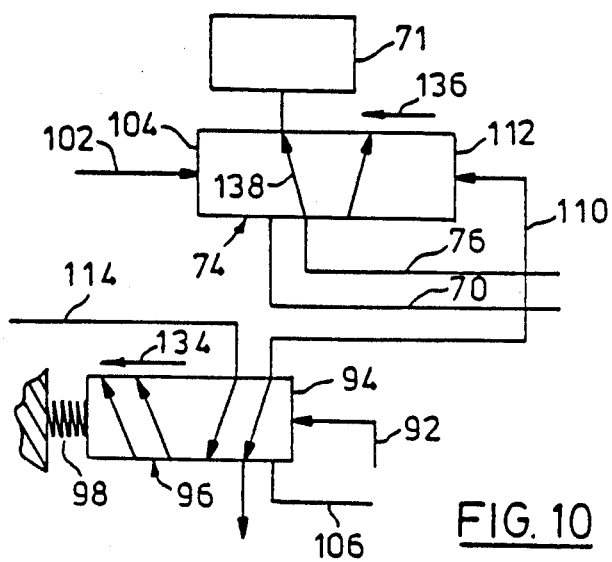
FIG. 10 is a flow diagram similar to FIG. 9 showing the brake system in operation.

The opening of valve 52 vents air from lines 81 and 82 which opens port 83 of valve 84 and allows pressurized air from line 120 to pass through valve 84, line 86, valve 88, line 90 and line 92 to throw shuttle valve 96, against the action of spring 98, in the direction of arrow 134 as seen in FIG. 10, relieving the pressure on end 112 of shuttle valve 74 by venting line 110 through a port 135, as seen in FIG. 10. Also the venting of bumper tube 24 through port 118 is cut off. This brings the brake system into readiness for automatic operation by the contact of bumper tube 22 with an obstruction.

When bumper tube 22 comes into contact with any obstruction an air pulse is sent from tube 24 along line 114 to valve 100 which opens port 116 and allows pressurized air from line 92 to pass through line 102 and against end 104 of shuttle valve 74, throwing valve 74 in the direction of arrow 136 as seen in FIG. 10, thus closing line 70 and opening auxiliary air line 76 through a port 138 to brake system 71. This automatically operates brake system 71 to stop the reverse movement of trailer 10 immediately.

In order to release the brake system from the automatically actuated mode the operator of the vehicle presses the foot brake which actuates valve 88 through lines 70 and 124 to port 126. This closes valve 88, cutting off the air supply to lines 90 and 92 and relieving the pressure on end 94 of shuttle valve 96. Shuttle valve 96 is thus allowed to be thrown back by spring 98 to its normal position and allows air from line 106 to pass through port 108 and line 110 to end 112 of shuttle valve 74 which throws that valve back to its normal position.

When the operator releases the foot brake or the trailer only brake, port 126 is opened which returns the system to its armed mode. On the resumption of forward movement of trailer 10, air valve 52 returns to its normal closed position as seen in FIG. 5 and 6. This closes port 83 of valve 84, thus returning the system to its original (normal) mode of operation.

In the modification shown in FIGS. 11 to 13 of the drawings the invention is activated through drive shaft 150 of a vehicle which carries a circumferential band 152 of magnets. An arcuate head 154 floats over band 152 and comprises a curved plate 156 carrying a row 158 of magnets on its concave side concentric with band 152. Head 154 is carried by a pair of support arms 160 fixed to a block 162 on the chassis of the vehicle. The free end portion 164 of each arm 160 carries lateral flanges 166 which are enclosed in a bearing box 168 encasing a row of spherical bearings 170 along each crevice formed by flanges 166 which free end portion 164. Stops 172 limit the travel of plate 156. Plate 156 is connected through a pivot pin 174 to one end of a link arm 176 which is pivotally connecting through a slot 178 at its other end to a pin 180 on block 162. Spring valve 52 projects through an aperture 182 located in arm 176 between pivot pins 174 and 180.

In the operation of the embodiment of FIGS. 11 to 13 the rotation of drive shaft 150 in the forward operation of the vehicle causes plate 156 to move in the direction of arrow 184 by the action of the magnets of band 152 on the magnets of row 158, keeping air valve 52 centered in aperture 182. When the vehicle moves in reverse the rotation of drive shaft 150 in the opposite direction causes plate 156 to move in the same direction which causes link arm 176 to move opening air value 52 and arming the system of FIG. 9 in the same manner as previously described.

Figure 14:
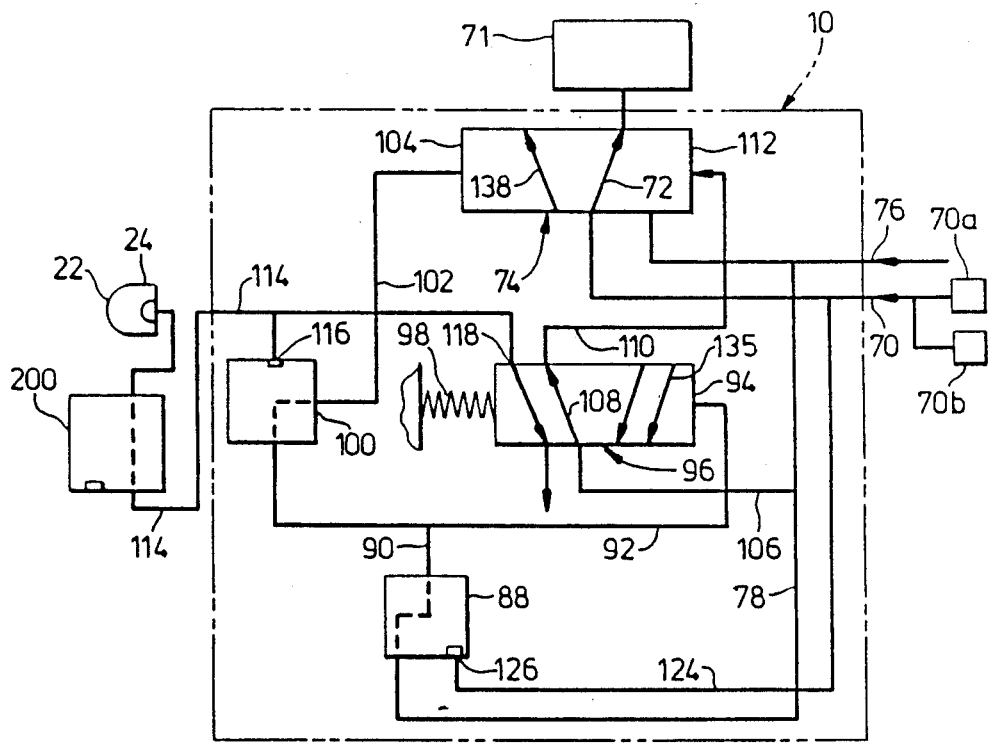
FIG. 14 is a schematic flow diagram of a second embodiment of the air brake system of the device.
Figure 15:
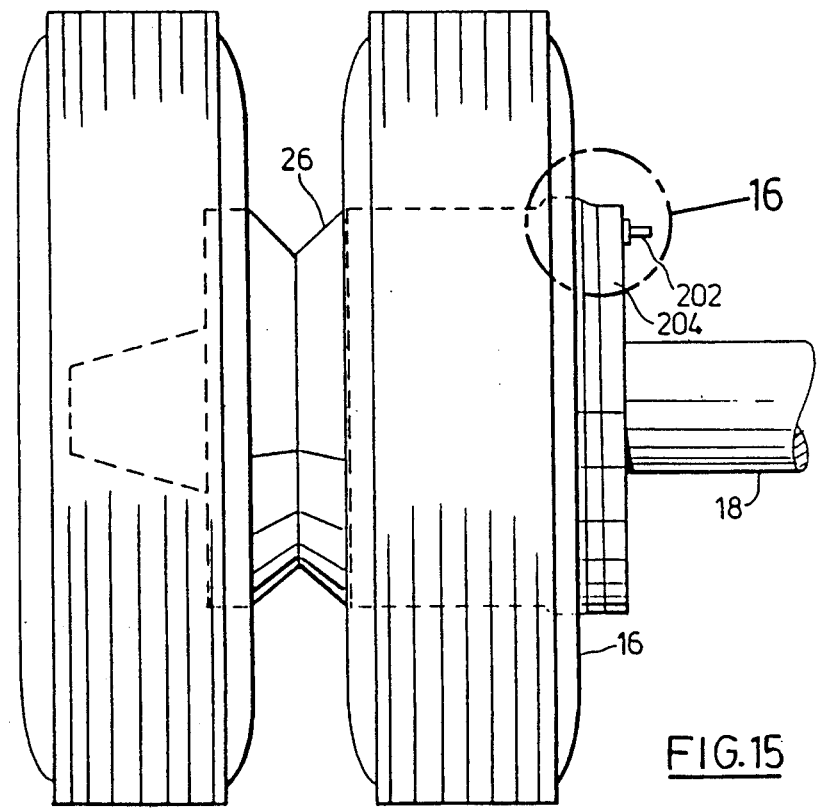
FIG. 15 is a side elevation of a wheel hub and brake drum casing of the trailer of FIG. 1 used in conjunction with the embodiment of FIG. 14.
Figure 16:
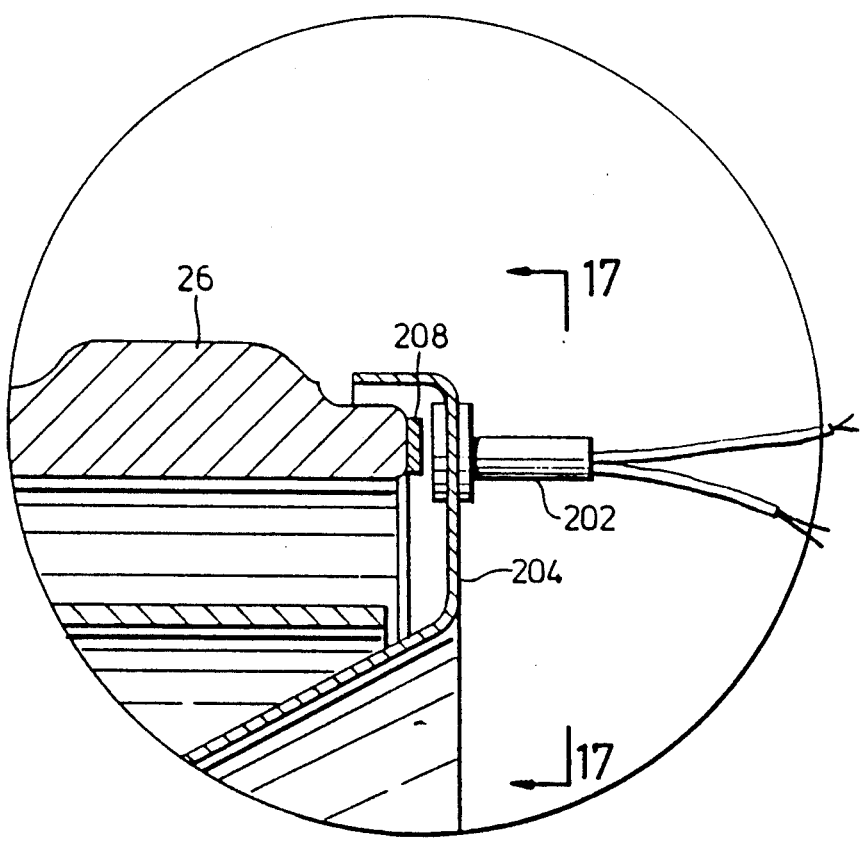
FIG. 16 is a cross-sectional view of area 16 in FIG. 15.
Figure 17:
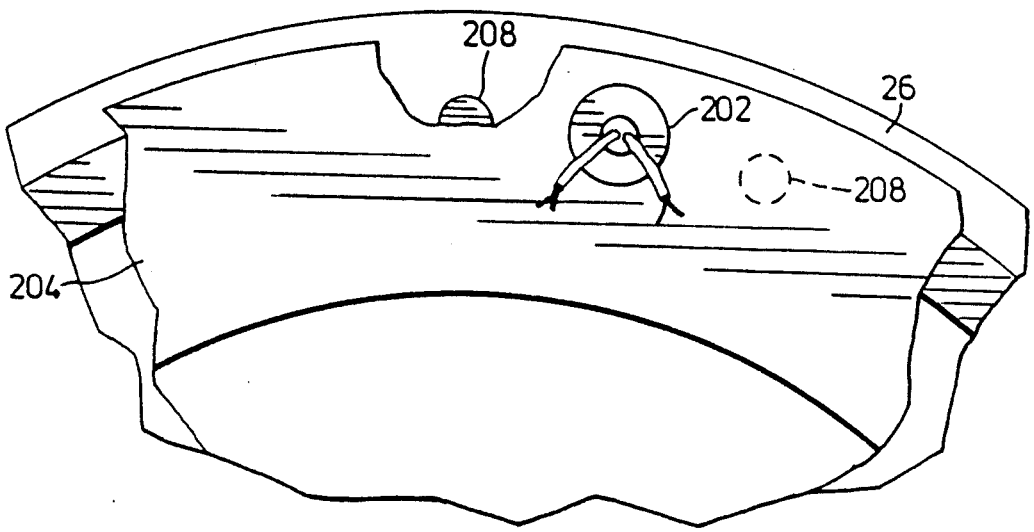
FIG. 17 is a view taken along line 17—17 of FIG. 16.

In a second embodiment of the invention shown in FIGS. 14 to 17 of the drawings valve 52, pressure reducing valve 80 and control valve 84 are deleted and auxiliary air supply line 76 is connected directly to normally open pass control valve 88. This allows the brake system to be in readiness at all times for automatic operation by the contact of bumpers tube 22 with an obstruction. If it is desired to disarm the brake system when the vehicle is in forward motion a normally open air operated solenoid valve 200 is located in line 114. A battery operated sensor 202 is fixed on stationary backplate 204 of a brake drum casing of wheel 16 of the vehicle and a pair of spaced magnets 208 are fixed on brake drum 26 facing sensor 202 as seen in FIGS. 15, 16 and 17.

In the operation of the embodiment shown in FIGS. 14 to 17 the brake system is armed as the vehicle moves forward, and magnets 208 provide pulses to sensor 202. When the vehicle reaches a predetermined minimum speed the frequency of the pluses causes sensor 202 to signal valve 200 to close the valve which disarms the brake system by cutting off any pulses of air from travelling along line 114 from bumper 22 should the bumper be impacted.

Figure 18:
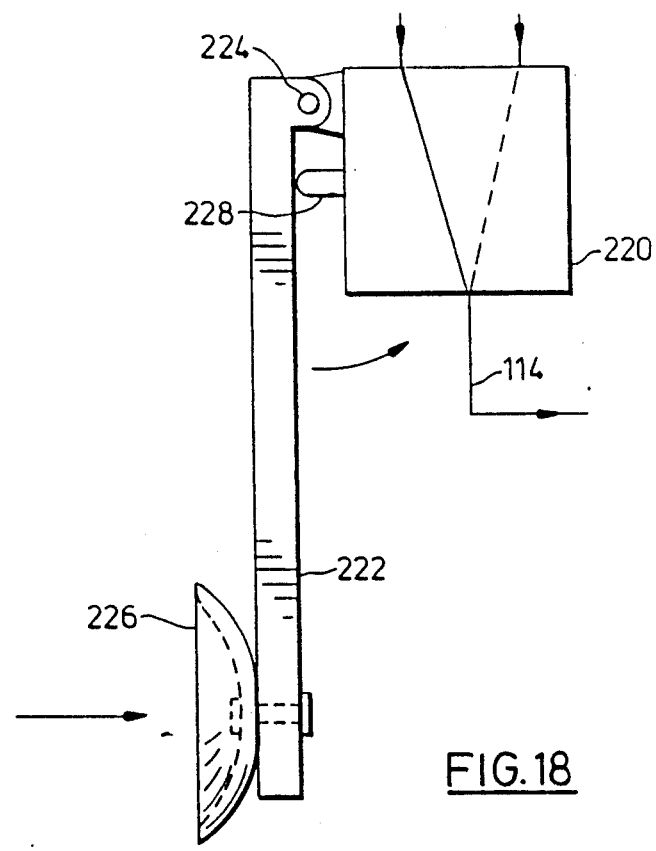
FIG. 18 is a side elevation of an alternate disarming device used with the embodiment of FIG. 14.

Another means of disarming the brake system of FIG. 14 is shown in FIG. 18 in which solenoid valve 200 is replaced by a mechanically operated normally open valve 220. A lever 222 depends from valve 220, one end of the lever being pivotably connected by a pin 224 to valve 220 and the other end of the lever carrying a dish 226. A plunger 228, which operates valve 220, contacts lever 222. In operation the velocity of the vehicle in forward movement creates air pressure on dish 226 which causes lever 222 to depress plunger 228 to close valve 220. Lever 222 is located on the underside of the vehicle and can be constructed and arranged to act as a governor, disarming the brake system at a given airflow corresponding to a given speed of the vehicle by cutting off any pulses of air along line 114 from bumper 22 should the bumper be impacted.

Figure 19:
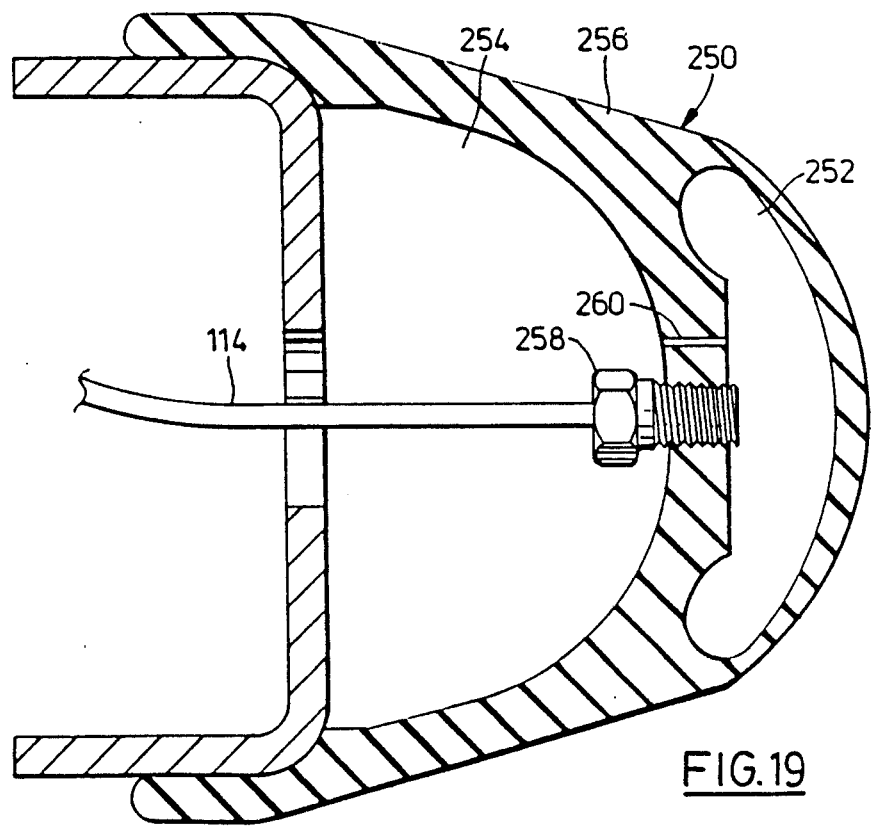
FIG. 19 is a cross-sectional view of an alternate embodiment of the rear bumper of FIGS. 1 and 2.

Bumper 22 may be modified as seen in FIG. 19 of the drawings. In this embodiment a bumper 250 comprises an outer air chamber 252 positioned in front of a cavity 254 between sides 256 of the bumper. Chamber 252 is connected through a fitting 258 directly into line 114 of the system of FIG. 9 and includes a breather passage 260 connecting the chamber with cavity 254. This construction gives an instantaneous air pulse to line 114 on impact of bumper 22 with an obstacle. Also breather passage 260 allows the air pressure within chamber 252 to be equalized with the ambient air pressure.

Figure 20:
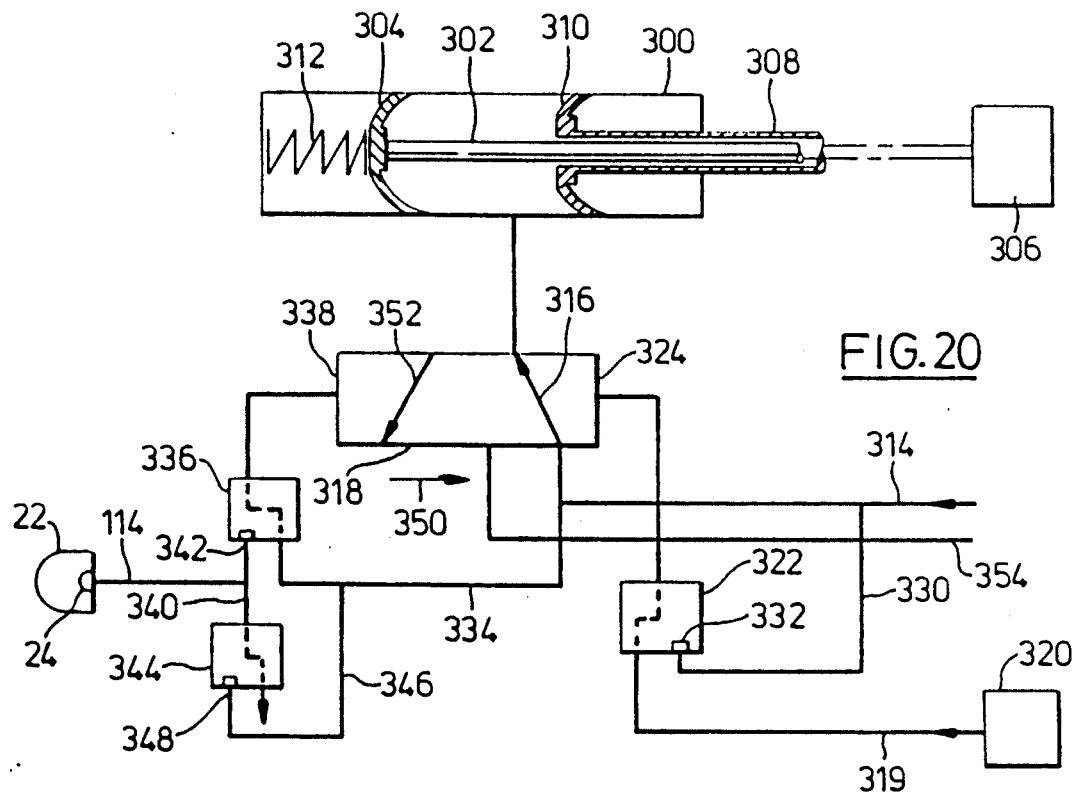
FIG. 20 is a schematic flow diagram of a third embodiment of the air brake system of the device.

In a third embodiment of the invention the emergency brake system of the tractor or trailer is used to arm the brake system constantly. As seen in FIG. 20, the emergency brake system includes a cylinder 300 having a first piston 302 connected at one end to a first diaphragm 304 and at the other end to the cam of vehicle brake (indicated diagrammatically by numeral 306). A second, hollow, piston 308, coaxial with piston 302, is connected to one end to a second diaphragm 310 and at the other end to the cam of brake 306. A compression spring 312 impinges on that side of diaphragm 304 opposite piston 302, is connected to one end to a second diaphragm 310 and at the other end to the cam of brake 306. A compression spring 312 impinges on that side of diaphragm 304 opposite piston 302 and the brake is disengaged by air pressure through an emergency brake air line 314 onto diaphragm 304 which causes the compression of spring 312. To engage brake 306 pressurized air is released from cylinder 300 to allow compression spring 312 to act against diaphragm 304 which moves piston 302 to cause the brake to be engaged. Emergency brake air line 314 passes through a normally open port 316 of a shuttle valve 318 to cylinder 300 between diaphragms 304 and 310. Open port 316 serves to keep emergency brake 306 in a released position. A line 319 from an air tank 320 passes through a normally closed pass control valve 322 and impinges on one end 324 of shuttle valve 318. A line 330 connects line 314 with control port 332 of valve 322. A line 334 leads from line 314 through a normally closed amplifying pass control valve 336 to impinge on the other end 338 of shuttle valve 318. A line 340 leads from control part 342 of valve 336 through a normally closed second pass control valve 344 to atmosphere. A line 346 connects control part 348 of valve 344 with lines 334 and 214. Air line 114 from tube 24 of bumper 22 is connected to line 340.

Figure 21:
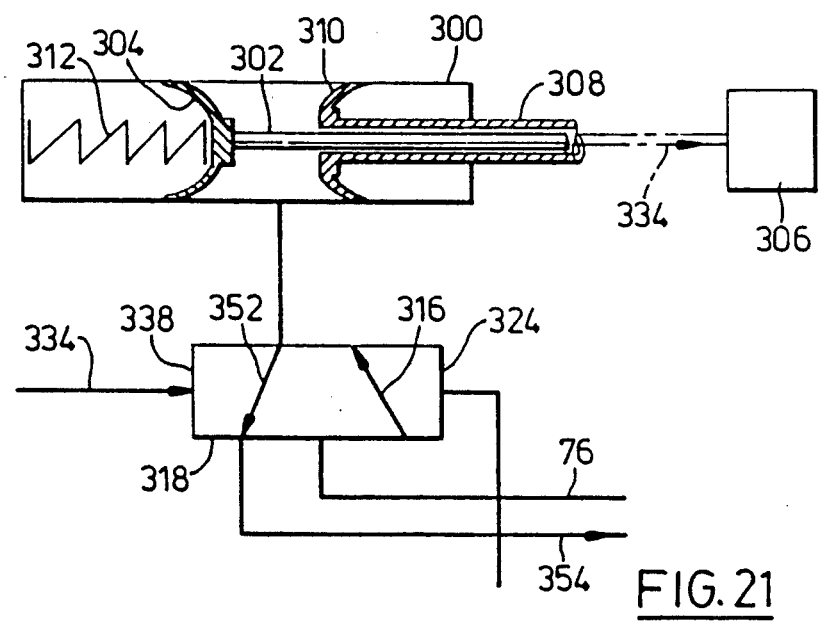
FIG. 21 is a flow diagram similar to FIG. 18 showing the brake system in operation.

Brake 306 is normally disengaged by air pressure from line 314 acting on diaphragm 304 which causes the compression of spring 312. When pressurized air is released from cylinder 300 by the action of the emergency brake it allows compression spring 312 to act against diaphragm 304 which moves piston 302 causing the brake to be engaged. The system is constantly armed and when bumper 22 contacts an obstruction the air pulse through line 114 opens valve 336 and passes air from line 334 to impinge on end 338 of shuttle valve 318 to throw the shuttle valve in the direction of arrow 350 as seen in FIG. 21. This cuts off the air passing from line 314 to cylinder 300 and vents the air from cylinder 300 through a part 352 and a line 354 to atmosphere, which then allows compression spring 312 to push piston 302 to apply brake 306. The cutoff of air from line 314 opens valve 322 and allows air from tank 320 through line 319 to impinge on end 324 of shuttle valve 318 and reset the brake system.

Figure 22:
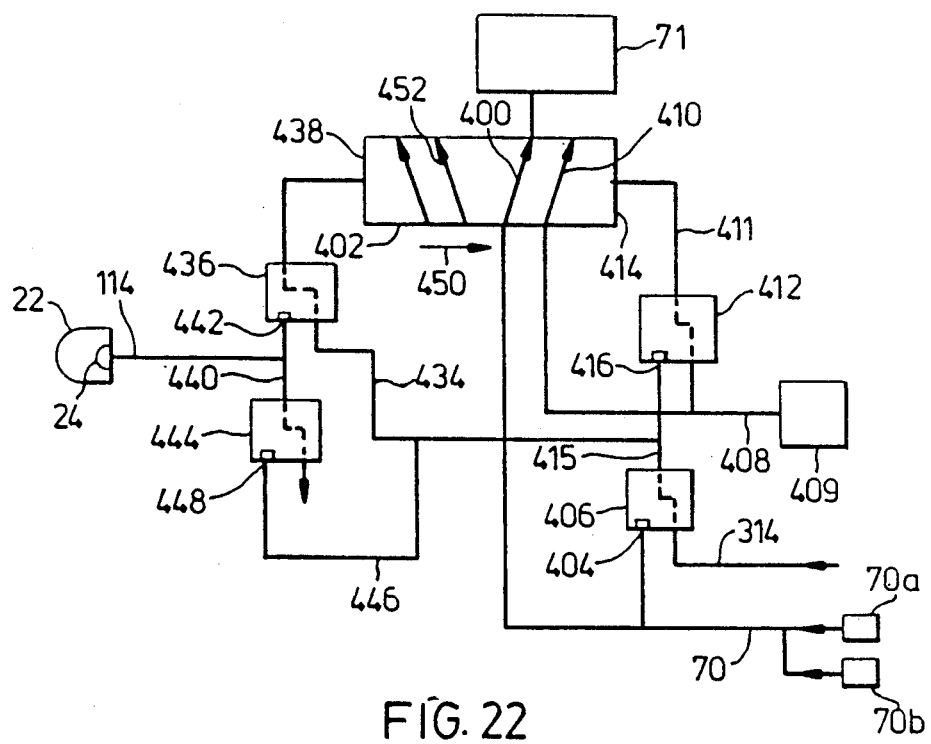
FIG. 22 is a schematic flow diagram of a fourth embodiment of the air brake system of the device.

In a fourth embodiment of the invention, shown in FIG. 22 of the drawings, the brake system may be rearmed by the service (foot) brake, the emergency brake or the trailer only brake. In this embodiment air brake line supply 70 from the service brake 702 and the trailer only brake 706 is connected to a normally open port 400 of a shuttle valve 402 to service brake 71 and to control port 404 of a normally open first pass control valve 406. Another air line 408 from an auxiliary constant pressure air tank 409 is connected to a second normally closed port 410 of shuttle valve 402 and also by a line 411 through a normally closed second pass control valve 412 to impinge on one end 414 of shuttle valve 402. Air supply line 314 from the emergency brake is connected through valve 406 and a line 415 to control port 416 of valve 412. A line 434 leads from line 415 through a normally closed amplifying valve 436 to impinge on the other end 438 of shuttle valve 402. Air line 114 from valve 24 of bumper 22 is connected to a line 440 which leads from control valve 444 to atmosphere. A line 446 connects control port 448 of valve 444 with line 434.

In the operation of the embodiment of FIG. 22 the brake system is armed by line 408 from air tank 409. On impact of bumper 22 an air pulse passes through line 114 to open valve 436 which allows air to pass from line 434 to impinge on end 438 of shuttle valve 402 to throw the shuttle valve in the direction of arrow 450. This causes air from tank 409 to pass through line 408 and a port 452 of shuttle valve 402 to brake 71. The brake may be released and the system rearmed in any one of three ways:

(1) by the foot brake. Applying foot brake 70a supplies air from line 70 to port 404 and closes valve 406 allowing lines 415, 434 and 446 to exhaust. The exhaustion of line 415 opens valve 412 and allows air from tank 409 through lines 408 and 411 to impinge on end 414 of shuttle valve 402 and reset the system.

(2) by the trailer only brake. Applying trailer only brake 70b supplies air from line 70 and the operation is the same as in (1).

(3) by the emergency brake. By applying the emergency brake air is discharged from line 314 which exhausts air through valve 406 from line 415, 434 and 446. This causes valve 412 to open and feeds air from tank 409 through line 408 to end 414 of shuttle valve 402 which rearms the system.

Figure 23:
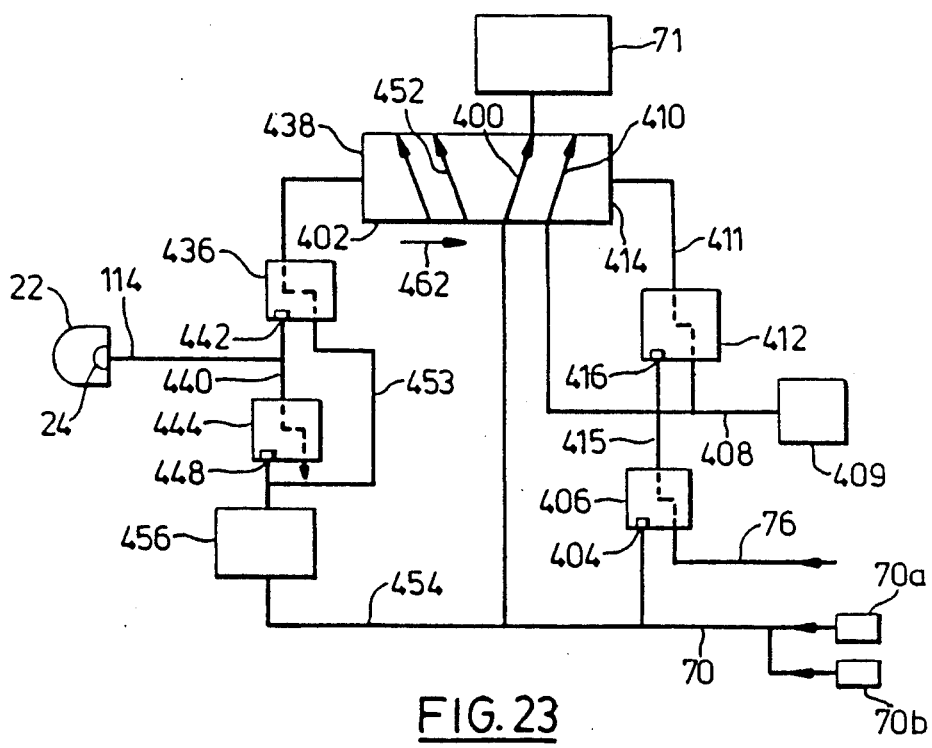
FIG. 23 is a flow diagram of a fifth embodiment of the air brake system of the device.

FIG. 23 shows an alternate embodiment to that shown in FIG. 22, in which line 434 of FIG. 22 is replaced by a line 453 from port 448 of valve 444 to end 438 of shuttle valve 402 and line 446 of FIG. 22 is replaced by a line 454 from line 70 through an air reservoir 456 to port 448 of valve 444. Air reservoir 456 includes a bleed-off valve not shown. In the operation of this embodiment the application of the foot brake charges reservoir 456 through line 70 which closes valve 448. Air then begins to bleed out of reservoir 456 and after a predetermined time the pressure is reduced in reservoir 456. On impact of bumper 22 air from line 114 passes through line 440 and opens valve 436. If there is air pressure in reservoir 456 then shuttle valve 402 will be activated in the direction of arrow 462, allowing air from tank 409 to pass through lines 408 and port 452 to brake chamber 71 which will apply the brakes. If there is no air pressure in reservoir 456 then no air will pass through line 453 to end 438 of shuttle valve 402, this rendering any impact on bumper inoperative to activate the braking system.

It will be appreciated that the tractor-trailer combination may be rigid and that the invention is also applicable to a tractor only vehicle.

Figure 24:
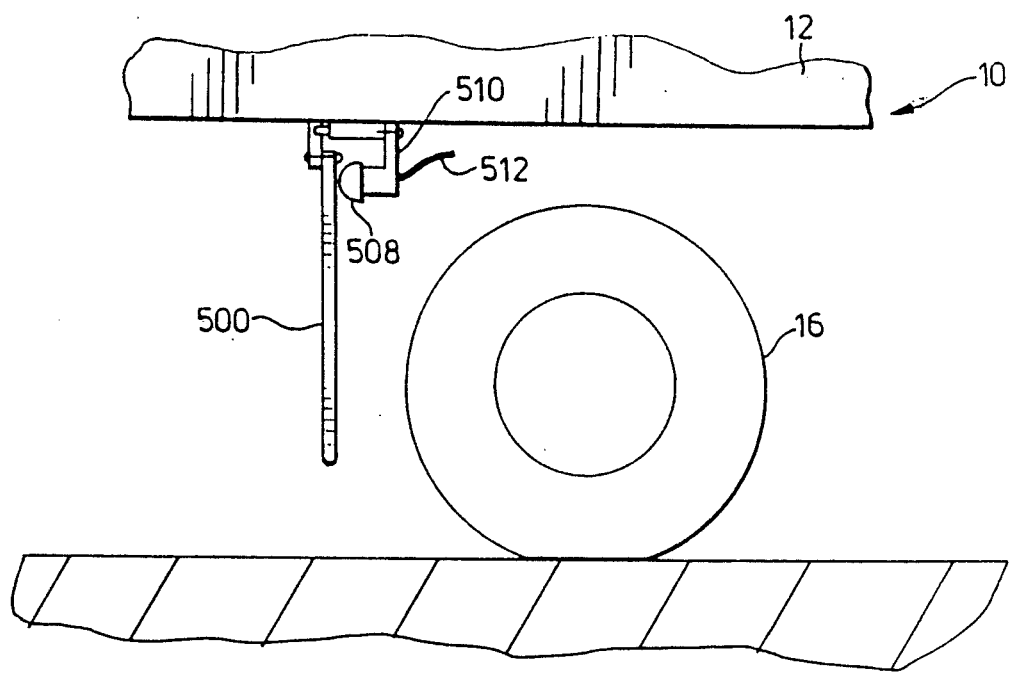
FIG. 24 is a side elevational view of a gate actuator for the air brake system of the device.
Figures 25, 26:
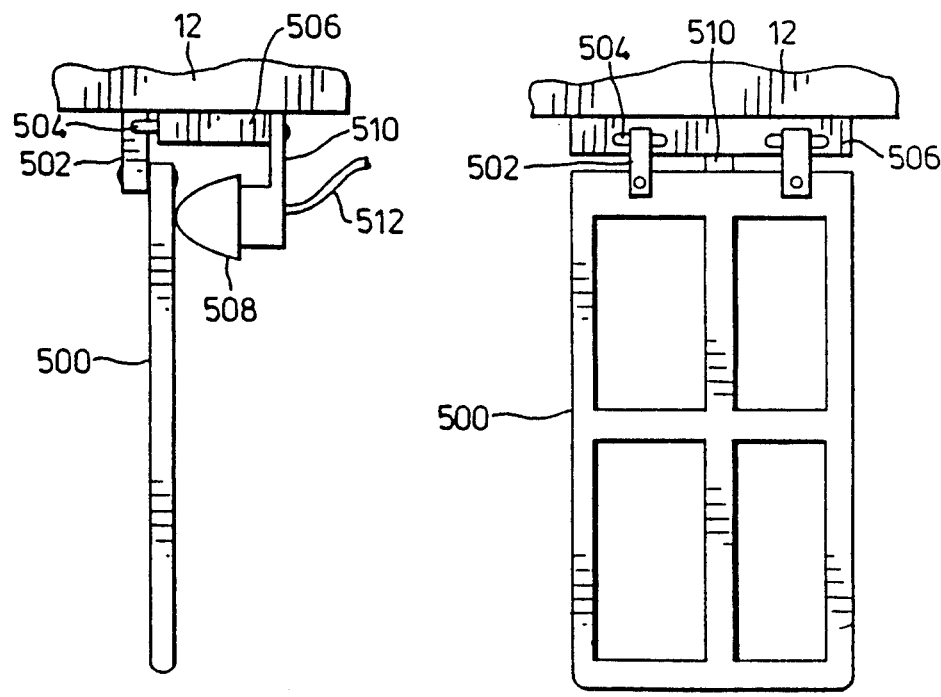
FIG. 25 is a detailed view of the gate actuator of FIG. 24.
FIG. 26 is a front elevational view of the gate actuator of FIGS. 24 and 25.

In the embodiment shown in FIGS. 24 to 26 of the drawings a gate 500 depends from frame 12 in front of each of the rear wheels 16 of trailer 10. Gate 500 is pivotably attached to frame 12 by a pair of lugs 502 each freely swingable on a U-shaped pin 504 fixed to a plate 506 which is bolted to frame 12. A sensor 508 similar in function to bumper tube 22 of the embodiment shown in FIGS. 1 and 2 of the drawings is fixed by a bracket 510 to plate 506 and is positioned adjacent gate 500. Sensor 508 is connected by an air line 512 to control port 116 of the air flow system of FIG. 9. In operation the contact of gate 500 with an obstruction swings the gate against sensor 108 which sends an air pulse along line 512 to valve 100 which operates brake system 71 to stop the forward movement of trailer 10 immediately. Of course in this embodiment it is necessary to modify the device of FIGS. 3 to 8, 11 to 13 or 16 and 17 in order to arm the brake system on forward movement of the vehicle. Also, gate 500 could be positioned in front of the forward wheels of a vehicle.

It will be appreciated that bumper tube 22 could be mounted on the front of a vehicle, in which case the automatic braking system would be disarmed when the vehicle exceeds a predetermined speed, say ten miles per hour.

It will be appreciated that the braking system may be disarmed either by cutting off the detector signal to the system (between the bumper bar and the valve box) or by cutting off the air to the system.

I claim:

1. A method of operating the brakes of a vehicle, comprising the steps of:
   sensing movement of the vehicle and arming, in response to said movement, an auxiliary pneumatic circuit means connected to the vehicle brakes whereby the brakes are actuable by a pneumatic detector signal;
   detecting the vehicle contacting an obstruction when the vehicle is moving, whereby a pneumatic detector signal is generated causing the auxiliary pneumatic circuit means to actuate the brakes;
   the brakes being releasable, and the pneumatic circuit means being rearmed after the release of the brakes.

2. A method as claimed in claim 1 in which the auxiliary pneumatic circuit means is armed only on movement of the vehicle in one direction.

3. A method as claimed in claim 2 in which the auxiliary pneumatic circuit means is disarmed on movement of the vehicle in the opposite direction.

4. A method as claimed in claim 2 in which the auxiliary pneumatic circuit means is disarmed upon movement of the vehicle in the direction opposite to said one direction and attaining a predetermined speed determined by sensing the rotational speed of a member which rotates in said one direction proportional to said speed.

5. A method as claimed in claim 2 including the step of sensing the rotational direction of a member which rotates in a first direction on movement of the vehicle in said one direction and in the direction reverse to the first direction on movement of the vehicle in the opposite direction, and arming the auxiliary pneumatic circuit means upon sensing rotation of the member in said reverse direction.

6. A method as claimed in claim 5 in which the brakes are released by applying a brake selected from the group consisting of the foot brake, the parking brake and the trailer only brake of the vehicle and the circuit means rearmed by releasing said brake.

7. A method as claimed in claim 6 in which the auxiliary pneumatic circuit means is disarmed on movement of the vehicle in said opposite direction.

8. A method as claimed in claim 6 in which the auxiliary pneumatic circuit means is armed and rearmed by filling an auxiliary air reservoir, the reservoir being bled over a predetermined time to disarm the auxiliary pneumatic circuit means.

9. A method as claimed in claim 1 in which the auxiliary pneumatic circuit means is disarmed after a predetermined time.

10. A method as claimed in claim 1 in which the auxiliary pneumatic circuit is disarmed on movement of the vehicle in the direction opposite to said one direction and attaining a predetermined speed determined by sensing the velocity of air flowing past the vehicle.

11. A method as claimed in claim 1 in which the brakes are released by applying a brake selected from the group consisting of the foot brake, the parking brake and the trailer only brake of the vehicle the pneumatic circuit means being rearmed after the release of the brakes.

12. A method of operating the brakes of a vehicle, comprising the steps of:
providing constantly armed auxiliary circuit means whereby the brakes are actuable by a pneumatic detection signal;
detecting the vehicle contacting an obstruction when the vehicle is moving, whereby a pneumatic detector signal is generated causing the circuit means to actuate the brakes;
the brakes being releasable and the auxiliary circuit means being rearmed after the release of the brakes.

13. A method as claimed in claim 12 in which pneumatic pressure for the auxiliary circuit means is drawn from a source selected from the group consisting of the emergency brake system of the vehicle, an auxiliary air tank and an auxiliary air reservoir.

14. A method as claimed in claim 12 in which the auxiliary pneumatic circuit means is disarmed by movement of the vehicle in one direction attaining a predetermined speed by sensing the rotational speed of a member which rotates in said one direction proportional to said speed.

15. A method as claimed in claim 12 in which the brakes are released by applying a brake selected from the group consisting of the foot brake, the parking brake and the trailer only brake of the vehicle and the auxiliary circuit means is rearmed by releasing said brake.

16. A method as claimed in claim 12 in which the auxiliary pneumatic circuit means is disarmable on the vehicle attaining a predetermined forward speed of the vehicle by sensing the velocity of air flowing past the vehicle.

17. A method as claimed in claim 16 in which the brakes are released by applying a brake selected from the group consisting of the foot brake, the parking brake, and the trailer only brake of the vehicle and the auxiliary circuit means is rearmed by releasing said brake.

18. For use in association with the brakes of a motor vehicle:
detector means, positioned on the vehicle, constructed and arranged to detect the vehicle contacting an obstruction when the vehicle is moving and to generate a pneumatic signal on said contact;
means to sense movement of the vehicle;
auxiliary pneumatic circuit means armable on movement of the vehicle whereby the detector signal when generated causes the circuit means to actuate the brakes of the braking system brake application; and
means to rearm the auxiliary pneumatic circuit means on release the brakes.

19. Apparatus auxiliary pneumatic circuit as claimed in claim 18 including means to disarm the braking system upon forward movement of the vehicle attaining a predetermined speed.

20. Apparatus as claimed in claim 18 constructed and arranged to be released and rearmed by the application of a brake selected from the group consisting of the foot brake, the trailer only brake and the emergency brake of the vehicle.

21. A braking auxiliary pneumatic circuit as claimed in claim 18 including means to disarm the system after a predetermined time.

22. Apparatus as claimed in claim 18 in which the disarming means comprises means to sense the velocity of the air flowing past the vehicle.

23. Apparatus as claimed in claim 18 in which the means to arm the auxiliary circuit means includes an auxiliary air reservoir, the auxiliary circuit means being armed and being constructed and arranged to be released and rearmed by the application of a brake selected from the group consisting of the foot brake and the trailer on brake of the vehicle, the auxiliary circuit means being rearmed by filling the reservoir, the reservoir being bled over a predetermined time to disarm the auxiliary circuit means.

24. Apparatus as claimed in claim 18 including sensor means effective to sense the rotational direction of a member which rotates in one direction on forward movement of the vehicle and in the opposite direction on rearward movement of the vehicle, and means to arm the system upon sensing rotation of the member in said opposite direction.

25. Apparatus as claimed in claim 24 in which the sensor means comprises a pair of spaced, opposed interacting magnet means one mounted on a rotational element of the vehicle and movable therewith and the other mounted on a fixed element of the vehicle.

26. Apparatus auxiliary pneumatic circuit as claimed in claim 18 in which the detector means comprises a gate positioned forwardly of at least one wheel of the vehicle to detect the vehicle contacting an obstruction.

27. Apparatus as claimed in claim 18 in which the detector means comprises a gate positoned forwardly of at least one wheel of the vehicle to detect the vehicle contacting an obstruction.

28. For use in association with the brakes of a motor vehicle:
detector means, positioned on the vehicle, constructed and arranged to detect the vehicle contacting an obstruction when the vehicle is moving and to generate a pneumatic detector signal on said contact;
armed auxiliary pneumatic circuit means whereby on the vehicle contacting an obstruction the detector signal causes the circuit means to actuate the brakes, the brakes being releasable.

29. Apparatus as claimed in claim 28 constructed and arranged to be released and rearmed by the application of a brake selected from the group consisting of the foot brake, the trailer only brake and the emergency brake of the vehicle.

30. An apparatus as claimed in claim 28 in which the auxiliary air supply means is selected from the group consisting of the emergency brake system of the vehicle, an auxiliary air tank and an auxiliary air reservoir.

31. Apparatus as claimed in claim 28 including means to disarm the auxiliary pneumatic circuit after a predetermined time.

32. Apparatus auxiliary pneumatic circuit as claimed in claim 28 including means to disarm the braking system upon forward movement of the vehicle attaining a predetermined speed.

33. Apparatus as claimed in claim 28 in which the detector means comprises a gate positioned forwardly of at least one wheel of the vehicle to detect the vehicle contacting the obstruction.

* * * * *